United States Patent [19]

Kurowski et al.

[11] Patent Number: 5,895,457

[45] Date of Patent: Apr. 20, 1999

[54] AUTOMATED FILLING STATION WITH CHANGE DISPENSER

[75] Inventors: Michael Kurowski, Littleton; Thomas P. Bruskotter; Edward M. Swapp, both of Englewood, all of Colo.

[73] Assignee: Gary-Williams Energy Corporation, Denver, Colo.

[21] Appl. No.: 08/946,304

[22] Filed: Oct. 7, 1997

Related U.S. Application Data

[63] Continuation-in-part of application No. 08/868,247, Jun. 3, 1997, abandoned.

[51] Int. Cl.$^6$ ............................................ G06F 17/60
[52] U.S. Cl. .................. 705/413; 194/206; 194/210; 222/14; 222/23; 235/381; 364/479.02; 364/479.11; 705/16
[58] Field of Search .................. 194/200, 206, 194/210, 211, 212; 221/21; 235/381; 222/14, 23; 364/479.01, 479.02, 479.11, 479.12, 479.14; 705/1, 16, 17, 22, 413

[56] References Cited

U.S. PATENT DOCUMENTS

| | | | |
|---|---|---|---|
| 3,184,714 | 5/1965 | Brown, Jr. et al. | 194/210 X |
| 3,618,732 | 11/1971 | Forse | 194/206 |
| 3,786,421 | 1/1974 | Wostl et al. | 340/149 A |
| 3,921,854 | 11/1975 | Formica et al. | 222/16 |
| 3,931,497 | 1/1976 | Gentile et al. | 235/61.7 |
| 3,999,685 | 12/1976 | Greenwood | 222/16 |
| 4,900,906 | 2/1990 | Pusic | 235/381 |
| 5,596,501 | 1/1997 | Comer et al. | 364/464.23 |
| 5,608,643 | 3/1997 | Wichter et al. | 364/479.014 |
| 5,797,470 | 8/1998 | Bohnert et al. | 186/53 |
| 5,798,931 | 8/1998 | Kaehler | 364/479.01 |

FOREIGN PATENT DOCUMENTS

WO98/03980  1/1998  WIPO.

OTHER PUBLICATIONS i Series Drive-Up Solutions, product literature by Diebold, Incorporated, 1995.

*Primary Examiner*—Edward R. Cosimano
*Attorney, Agent, or Firm*—Holme Roberts & Owen LLP

[57] ABSTRACT

The automated filling station system of the present invention allows customers to obtain change in currency at the time of purchase, thereby accommodating cash customers as well as credit customers, and one-time customers as well as returning customers. In one embodiment, the system is implemented as a network (10) of filling stations (16) that report to a remote host computer (12). Each filling station (16) has a number of fuel pump systems (22) and a change dispenser system (24). Upon completion of a fueling transaction, a code is provided to a customer at a fuel pump system (22). The customer can enter the code to receive cash at the change dispenser (24) or can use the code for credit towards a subsequent fuel purchase within the network (10).

20 Claims, 5 Drawing Sheets

AUTOMATED FILLING STATION WITH CHANGE DISPENSER

This application is a continuation-in-part of United States patent application Ser. No. 08/868,247 filed on Jun. 3, 1997 now abandoned.

FIELD OF THE INVENTION

The present invention relates in general to the operation of filling stations, i.e., retail outlets for the sale of gasoline, diesel or other fuel. In particular, the present invention relates to a method and apparatus for automating operation of a filling station that facilitates payment in forms including cash payment.

BACKGROUND OF THE INVENTION

Increasing automation of filling stations offers a number of potential advantages including customer convenience, reduced labor and risk to personnel, and lower prices. Customer convenience may be enhanced due to longer hours of operation, more service sites and reduced transaction times. In addition to the advantages of reduced personnel and working hours, automation of filling stations improves personnel safety by reducing cash handling. Reduced operating costs also benefit consumers through lower prices. For all of these reasons, the industry has long sought ways to increase filling station automation.

One form of automation that has gained widespread acceptance is the ability to pay at the pump using credit or debit cards. Typically, a card reader and a monitor are provided at the pump. The monitor prompts the customer to initiate a transaction by inserting a card into the card reader. Upon reading the card, the pump system accesses a card approval service, e.g., the BUYPASS. Upon reading the card, the pump system accesses a card approval service, e.g., the BUYPASS authorization system, PAYPOINT authorization system or other credit card authorization network, in order to obtain card approval for a selected approval amount. The approval amount does not necessarily accurately reflect the subsequent fueling transaction amount. If approval is obtained, the pump system is enabled and the customer may proceed with fueling. Alternatively, where available, so-called smart card systems may allow for payment approval without accessing an external approval service.

Another type of system that is in limited use allows for cash payments. A difficulty associated with cash payments is that customers often desire to fill their tanks and therefore do not know the transaction amount ahead of time. Other customers may wish to receive change to have available for other reasons. One existing system addresses this problem by providing credit vouchers in the event that a balance remains upon completion of the fueling process. In this manner, the customer can pay in cash in an amount sufficient to cover a fill-up. When the fueling process is complete, the credit voucher system issues a voucher that is coded, e.g., with a six digit code, to indicate a balance owed to the customer as change. On a subsequent visit, the customer can enter the code into a keypad of the pump system to receive credit corresponding to the amount of the previously unused payment or balance.

Although existing systems have benefited the industry and some consumers and have achieved significant success with respect to certain segments of the market, the present invention addresses various needs that remain to be satisfied.

SUMMARY OF THE INVENTION

It has been recognized that existing automated filling station systems do not address the needs of a range of consumers. In this regard, credit card based pay-at-the-pump systems do not accommodate customers who do not have or do not wish to use credit cards. In addition, the increased transaction costs associated with credit cards are reflected in higher prices for credit card customers or all customers. Credit voucher systems may be convenient for returning customers but are unattractive to customers who are only transiently present in a service area (e.g., interstate traffic), and to customers who would prefer not to be responsible for keeping track of vouchers or who would otherwise prefer not to be limited to returning to the same vendor.

The present invention is directed to an automated filling station system that accommodates the needs of customers including cash customers by providing change in the form of currency. The system encompasses a process and corresponding structure involving, inter alia: providing a pump system for dispensing fuel including a payment processor for receiving payments from customers and controlling operation of the pump system in response to such payments; receiving a payment from a customer in a customer selected amount at the pump system; monitoring a fueling process by the customer to identify a completion of the process (e.g., returning the fuel nozzle to its hanger or turning the pump off) and determining an amount due associated with the fueling process; comparing the customer selected payment amount to the amount due to determine any balance due to the customer in connection with the fueling process; providing a change dispenser for dispensing change in the form of currency (e.g., bills and/or coins); and controlling operation of the change dispenser to provide change in currency to a customer based on the determined balance due to the customer. The pump system is preferably capable of receiving payment in various forms including credit and debit cards or the like, cash and previously issued tickets or credit vouchers (for the convenience of returning customers). The pump system may therefore include a magnetic or other card reader, bill and coin slots, and/or a credit voucher slot and will typically include at least a card reader and bill slot. The change dispenser, which may be provided at the pump or a separate location, preferably provides change in multiple denominations, e.g., some or all of United States ten dollar bills, five dollar bills, one dollar bills, quarters, dimes, nickels and pennies. A system is thus provided that accommodates cash customers as well as credit customers, and one-time customers as well as returning customers.

According to one aspect of the present invention, operation of the change dispenser is controlled based on code information. In particular, the automated filling station system includes logic (e.g., hardware, firmware and/or software) for generating transaction specific codes (e.g., numeric or alphanumeric) and associating particular codes with particular transactions to indicate a balance due in connection with the transaction. For example, upon receiving a "fueling complete" signal from a pump, the logic may obtain/retrieve the customer-selected payment amount and the transaction amount, compare these amounts to determine a balance due, generate a random or selected string of characters or password to serve as a code, create a file or the like in memory (e.g., computer memory, buffer storage and/or cache storage) relating the code to the determined balance due, and transmitting the coded balance information to, or otherwise making the coded balance information available to, the change dispenser. The logic is preferably embodied in software so as to allow on-site or remote access without hardware replacement or modification.

The balance code can be, for example, embedded in a machine readable ticket, displayed to the customer on a monitor or printed on a receipt. The change dispenser includes a code processor and a customer input device such as a ticket slot, keyboard or the like. The code processor receives a code from the customer via the customer input device, and the dispenser dispenses change to the customer based on the code and coded balance information stored in a database. This coded control of the change dispenser allows customers to choose between cashing in any balance due or saving the balance for application towards a subsequent fueling transaction, and also provides improved filling station configuration and servicing options.

According to another aspect of the present invention, a centralized change dispenser is associated or networked with multiple (two or more) pump systems via a control system. The control system generates coded balance information for particular transactions as described above and makes the coded balance information available to the change dispenser. The pump systems provide corresponding codes to customers who are due a balance. If change is desired, as opposed to credit towards a future transaction, the customer approaches the centralized change dispenser from any of the pump systems and enters the transaction-specific code. The change dispenser is able to dispense change to customers from each of the pump systems based on the coded balance information by virtue of the networked relationship. The filling station and its controller may be networked, in turn, with other filling stations and a remote host computer. In this manner, change machine servicing for an automated filling station is greatly simplified. In addition, reprogramming to change certain system parameters related to code validation and termination, cash machine related alarms, and the like is simplified.

The automated filling station system of the present invention thus accommodates cash customers as well as credit customers and one-time customers as well as returning customers, and thereby more fully realizes the potential benefits of automated filling stations. The invention also simplifies filling station servicing and remote access and control of automated filling stations.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION OF THE INVENTION

In the following description, the invention is set forth in the context of a particular automated filling station environment. It will be appreciated that certain aspects of the present invention are applicable to other environments. The automated filling station implementation of the present invention can be a single site system or a network of filling stations, can be a stand-alone filling station or associated with a convenience store, supermarket, department store, discount store, etc., and can be maned or unmanned. Numerous other environmental factors can be varied as desired. For the sake of completeness, the illustrative embodiment of the invention described below is set forth in the context of a network of filling stations, some of which are associated with stores.

Figure 1:
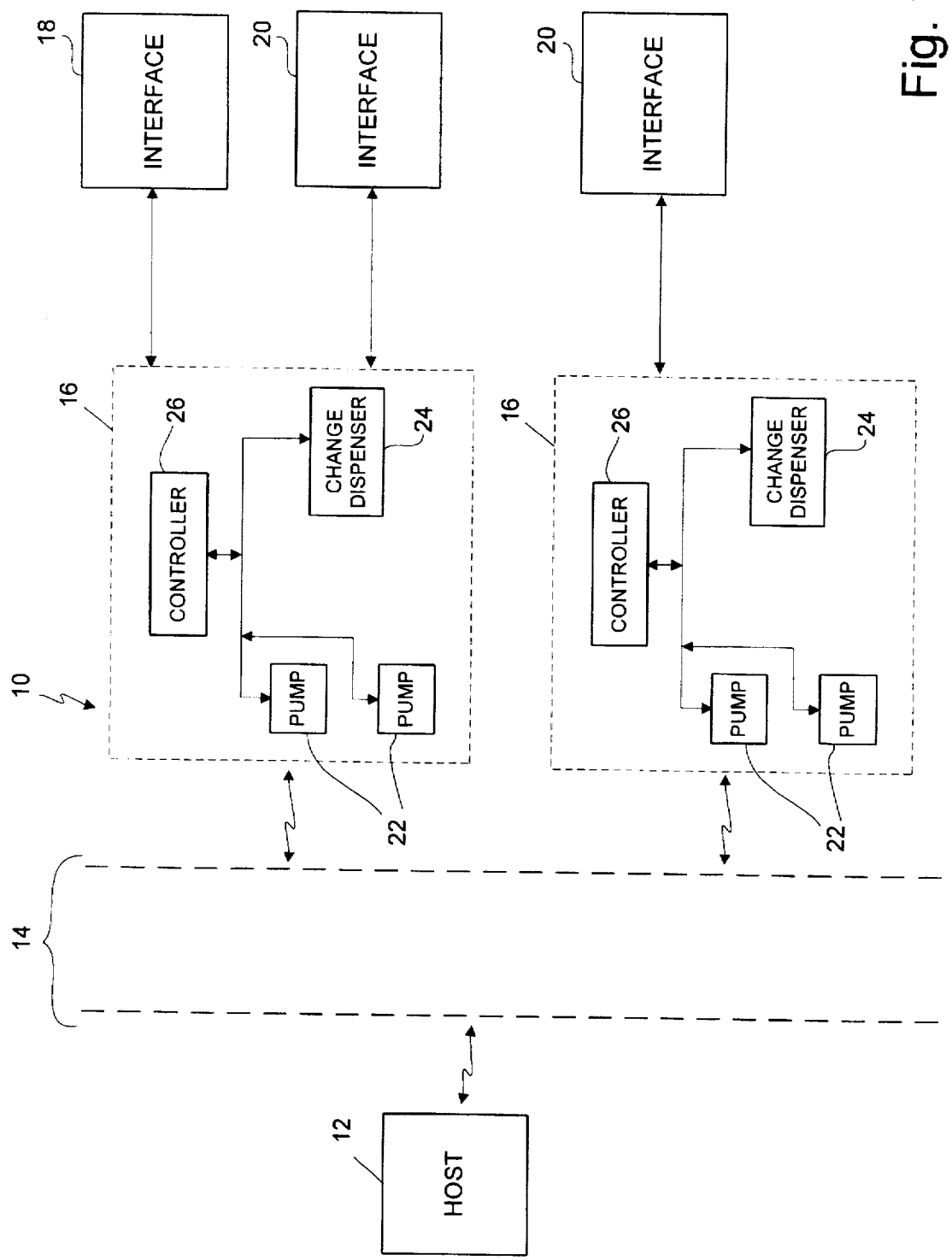
FIG. 1 is a schematic diagram of an automated filling station network in accordance with the present invention.

Referring to FIG. 1, an automated filling station network is generally identified by the reference numeral 10. Generally, the network 10 includes a number of filling station sites 16 that communicate with a remote host computer 12, via a public or private communications network 14, such as the Internet. Although the illustrated network 10 is shown as including only two filling station sites 16, it will be appreciated that any number of filling stations may be included in the network 10.

Each filling station site 16 includes a number of fuel pump systems 22, at least one change dispenser system 24, and a site controller 26. Again, although the illustrated filling station sites 16 are shown as including only two fuel pump systems 22, each site 16 can include any number of fuel pump systems 22. Similarly, although a single change dispenser 24 per site 16 is preferred for ease of maintenance, any number of change dispensers 24 per site 16 can be included as desired, and the change dispenser can be incorporated into the individual pump systems rather than provided separately as shown. The site controller 26 implements logic as will be described below. The logic can be embodied in hardware, firmware or software. Preferably, the logic is embodied in software so as to facilitate remote or onsite revisions and updates without changing or modifying hardware.

A number of interfaces are also shown at each filling station site 16. Such interfaces can include a store data system interface 18, and maintenance and restocking interfaces 20. The store data system interface 18 is particularly applicable where the filling station site 16 is associated with a convenience, discount or other store. The interface 18, which may be any suitable network connection, allows the store data system and the network data system to exchange data for inventory, accounting and other purposes. The maintenance and restocking interfaces 20, which may include a user interface device such as a keyboard and a scanner for reading identification cards, are provided for tracking refueling of the filling station site 16, restocking of the change dispenser 24, onsite administrative updates, and other purposes.

Figure 2:
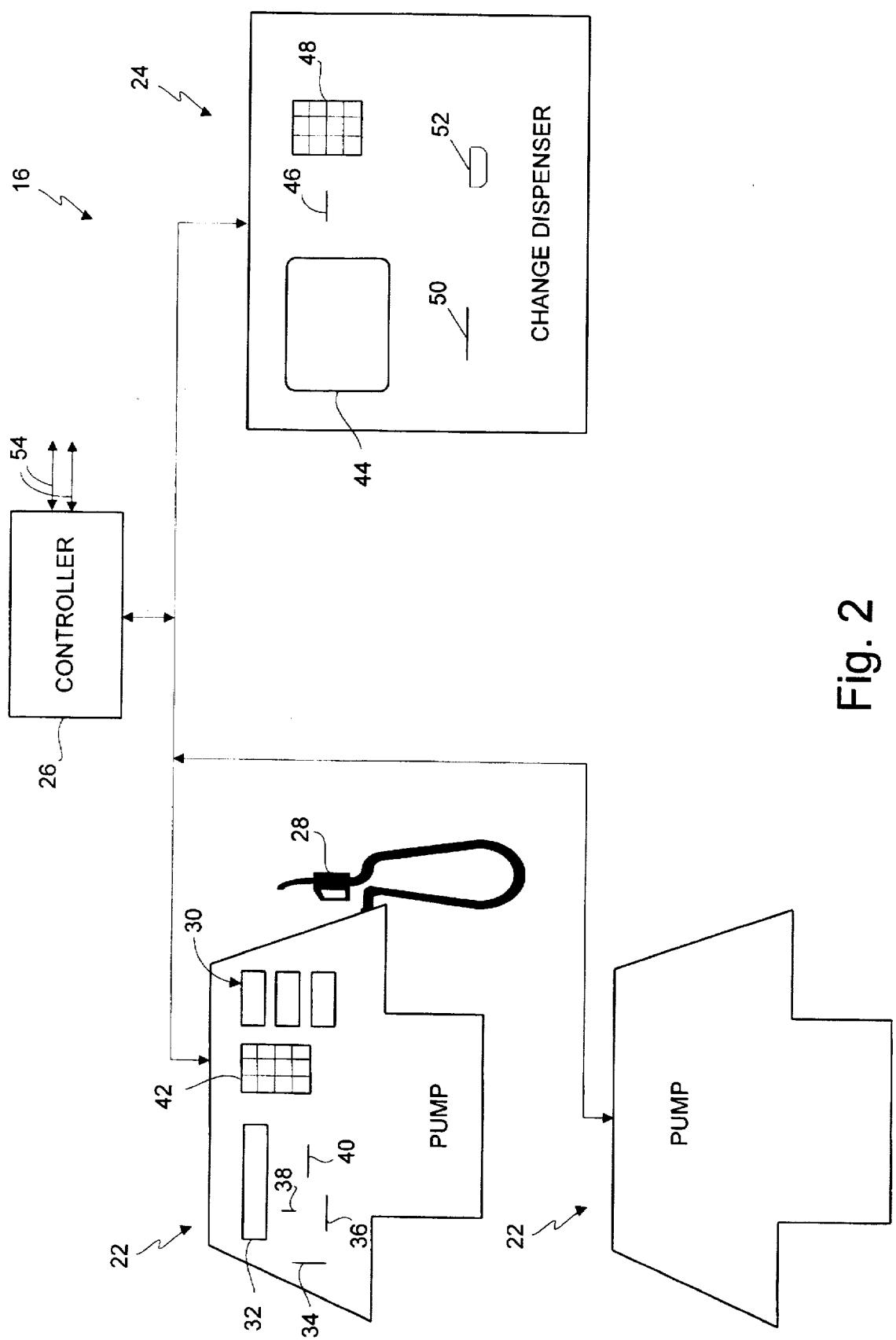
FIG. 2 is a schematic diagram showing the components at an individual filling station site of the network of FIG. 1.

Additional details of a filling station site 16 are shown in FIG. 2. The illustrated pump system 22 can receive payment in a variety of forms including cash, credit or debit cards, and previously issued system credit, i.e., by way of a balance code entered on a keyboard or, optionally, a coded voucher. In this regard, the pump system 22 includes some or all of a card reader 34, such as a conventional magnetic card swiper, a bill acceptor 36, an optional coin acceptor 38, and an optional voucher reader 40. Typically, the pump system 22 will include at least a card swiper and a bill acceptor. The voucher reader 40, if provided, receives and processes vouchers containing machine readable code information. For example, the machine readable code information may be provided in the form of a bar code, magnetic coding or other machine readable format. The pump system also includes a message display 32 such a monochromatic dot matrix display system for displaying various messages such as instructions, prompts, advertisements, and error messages. A user input device such as a key pad 42 may be also provided for various user input functions such as (optionally) selecting payment type, entering a security or prior payment balance code, and approving payment amounts. The pump system 22 also includes conventional pump components such as a fuel dispenser nozzle 28 and a pump display 30 for displaying a running transaction amount, price information and fuel amount.

The illustrated change dispenser system 24 receives code information input by a customer, retrieves associated coded balance information from the site controller 26 and dispenses change in the form of bills and coins. The system 24 which may be, for example, a cash machine manufactured by Diebold, Inc. of Canton, Ohio, includes: a dispenser display 44 for displaying instructions, prompts, advertisements and the like; a user input device such as a key pad 48 for manually inputting code information, identification information or the like; a bill dispenser 54 providing change in the form of bills such as some or all of United States ten dollar bills, five dollar bills and one dollar bills; and a coin dispenser 52 for dispensing change in the form of coins such as some or all of quarters, dimes, nickels and pennies. For simplicity, the change dispenser system 24 may use only a smaller set of denominations. For example, dimes may be eliminated as they can be readily replaced by nickels. The pump system 22 and the change dispenser system 24 are interconnected to form a network. The network also includes the site controller 26 that performs a number of functions including monitoring pump system operations, generating and recording codes together with associated balances, receiving code inputs from the cash dispenser system 24, and controlling operation of the cash dispenser system 24 to provide change. The site controller 26 also includes two communication ports, generally identified by arrows 54, such as modems. The communication ports allow the site controller 26 to communicate with external card authorization systems, such as the BUYPASS authorization system, PAYPOINT authorization system or other credit card authorization network, and the host computer 12 (FIG. 1) of the automated filling station network 10. The site controller 26 of the illustrated embodiment is a computer and can be any suitable processing system such as, for example, an Intel PENTIUM processor based IBM computer compatible system with at least a 1 GB hard drive and 16 MB of RAM. The controller 26 runs Microsoft Windows 95 operating system or another operating system.

Figure 3:
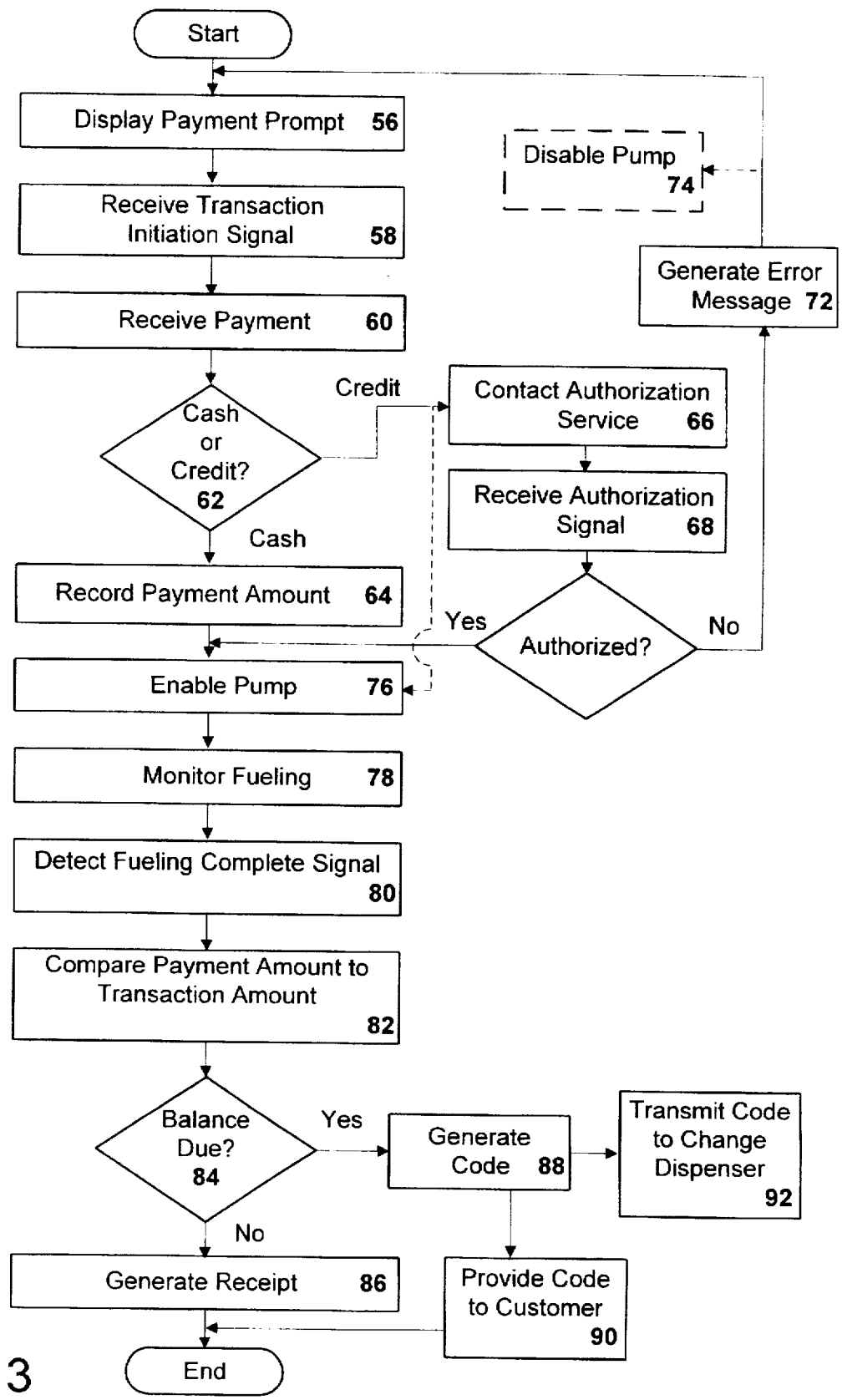
FIG. 3 is a flow chart illustrating a pump system related process according to the present invention.
Figure 4:
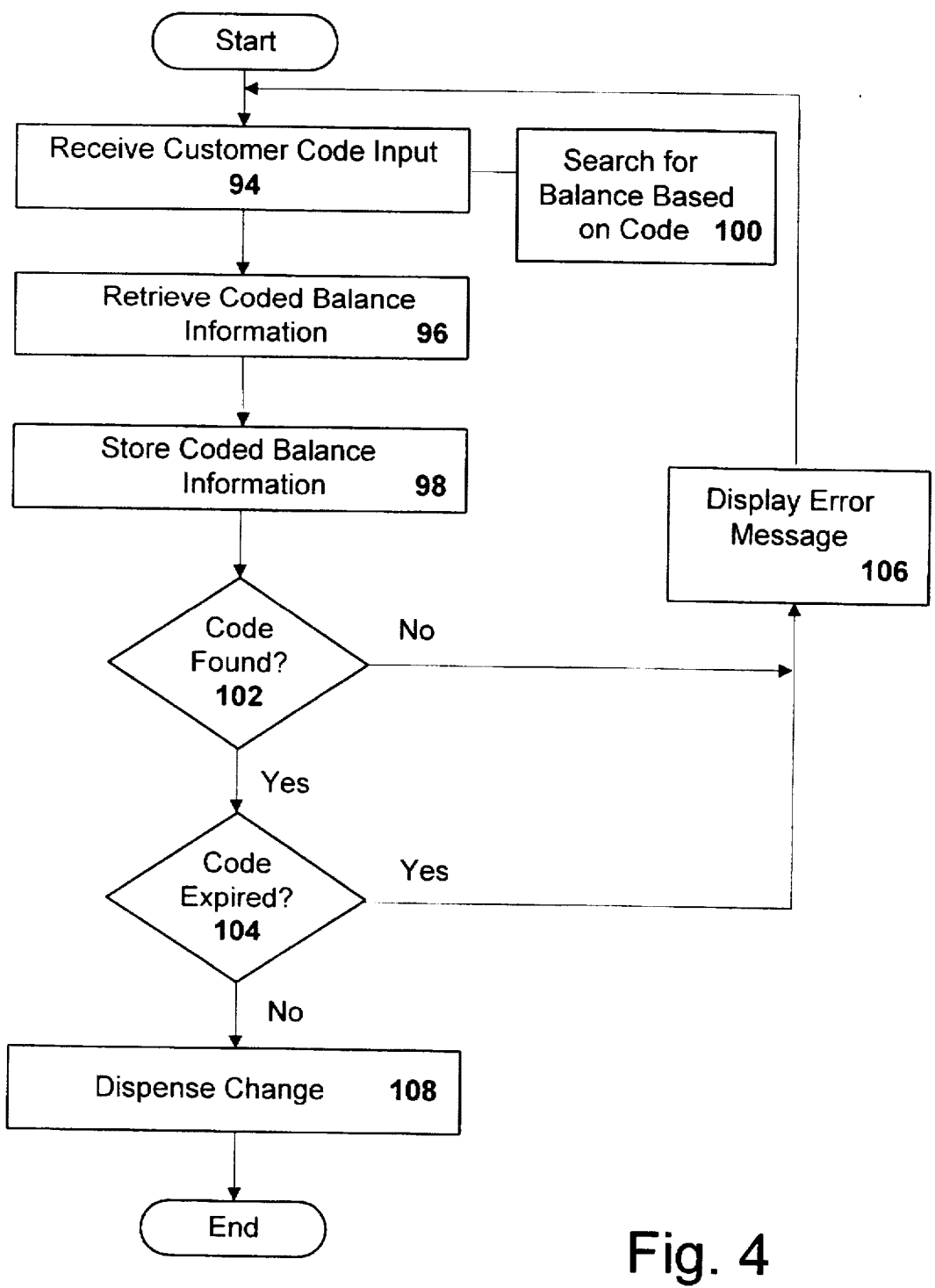
FIG. 4 is a flow chart illustrating a change dispenser system related process according to the present invention.

Various functions that are executed by the site controller 26 are outlined in the flow diagrams of FIGS. 3 and 4. More specifically, FIG. 3 illustrates a number of pump system related processes and FIG. 4 illustrates various cash dispenser system related processes.

Referring to FIG. 3, the pump system may be programmed to continuously or periodically display (56) a payment prompt such as "select payment type" or "insert payment" between transactions. A customer initiates a transaction by inserting a card, cash, or (where applicable) a credit voucher. The controller receives (58) a corresponding transaction initiation signal and the pump system receives and credits (60) payment. Payment is typically received at the pump system by receiving currency through the bill acceptor or by obtaining authorization of a credit or debit card in a specified amount (even though only the transaction amount may eventually be debited from the corresponding card account). Further processing of the transaction depends on whether the customer has selected cash or credit (62). For cash payments, the control system monitors the amount of currency received through the bill acceptor and records (64) the total payment amount. For credit payments, the control system contacts (66) an authorization service, waits for a response and receives (68) an authorization signal. If the card is not approved, the control system generates (72) an error message which is displayed to the customer. If the card is authorized, or if the customer pays in cash, then the pump is enabled (76) and the fueling process can begin.

Alternatively, the pump may be enabled prior to obtaining authorization as indicated in phantom on FIG. 3. If authorization is subsequently denied, then the control system can disable (74) the pump after fueling has been initiated. It will be appreciated that such immediate pump enablement entails a risk of loss by the fuel vendor. However, it is anticipated that any such losses will be minimal due to the speed of operation of the authorization system. Any such losses may be justified by the improved customer convenience and customer throughput resulting from reduced authorization delays.

During the fueling process the control system monitors (78) the fueling process to detect (80) a fueling complete signal. Depending upon the type of pump system employed, such a fueling complete signal may be generated in response to hanging up the pump nozzle or in response to manually turning the pump off by flipping a pump lever. Upon detecting the fueling complete signal, the control system communicates with the pump system to determine the transaction amount and compares (82) the payment amount to the transaction amount to determine whether a balance is due (84). If no balance is due, the control system generates a receipt (86) and the pump system related process is complete. On the other hand, if a balance is due, the control system generates (88) a code and associates the code with the balance due. The code can be generated by any suitable software such as random or modified random number generator (excluding previously used codes), or custom software for selecting predetermined codes from a code database. The control system relates the code to the corresponding balance and stores the code and balance in a coded balance data base that is indexed by code. In this manner, the coded balance information can be transmitted (92) to the change machine in response to a code input by the user.

The code can be provided (90) to the customer in any suitable form. For example, the code can be printed on the transaction receipt that is reported to the customer. Alternatively, a code such as a password or character string can be displayed to the customer on the pump system monitor. As a further alternative, it is anticipated that the pump system may be provided with the capability to issue a ticket or voucher to the customer that includes optically or magnetically encoded information corresponding to a numeric or alphanumeric code.

Once the customer has received the code, the customer may either retain the code and receive credit for the balance due in a subsequent fueling transaction at a site within the automated filling station network, or the customer may proceed with the code to the change dispenser system to receive change in the form of currency. FIG. 4 illustrates the change dispenser system related process. The process can be implemented by the customer in response to instructions and/or prompts displayed on the change dispenser system monitor. Upon approaching the change dispenser system, the customer initiates the change dispenser system process by entering the code supplied by the pump system e.g., by entering the code manually or, where available, by inserting a machine-readable voucher. The code is transmitted to the control system by the change dispenser system. The control system receives (94) the customer code input, and retrieves

(96) the coded balance information which has been stored (98) by the control system in computer memory. More particularly, the coded balance information is retrieved by searching (100) through the code indexed balance information data base based on the received code. If the code is found (102) and has not expired (104), then the change dispenser system dispenses (108) change in the form of currency in the amount indicated by the coded balance information. In this regard, it will be appreciated that network operators may desire to attach expiration dates to particular codes (e.g., 90 days after transaction date) for bookkeeping purposes. If the code is not found, or is expired, an error message is displayed (106) to the customer and the process may be restarted.

Figure 5:
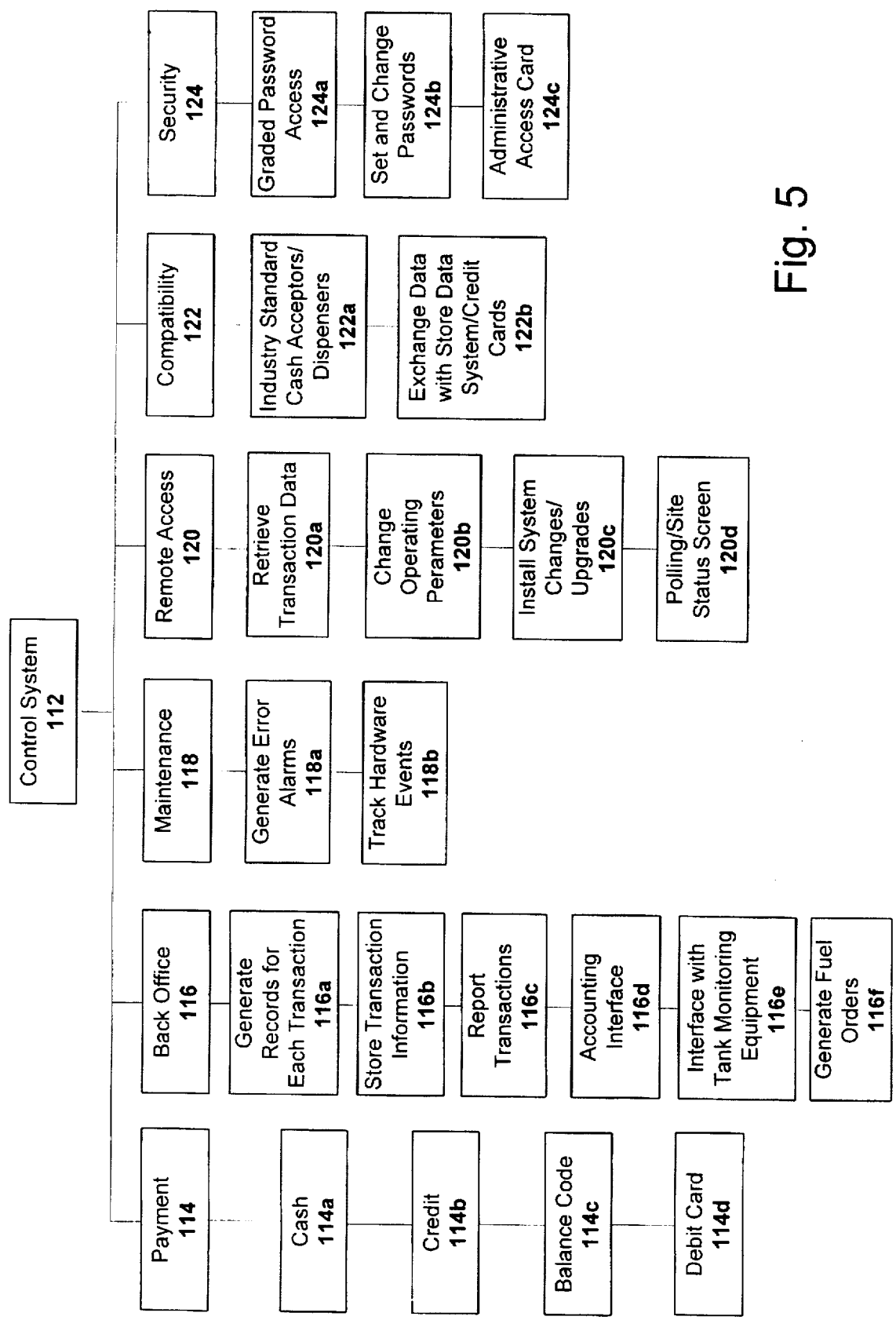
FIG. 5 is a chart outlining various functions and implementation options of the network of FIG. 1.

FIG. 5 shows a number of functions and implementation options for the control system of the automated filling station network. These functions can be executed by the remote host computer, the site controller or other elements of the overall control system. The illustrated functions can generally be grouped into the following categories: 1) payment functions (114); 2) back office functions (116); 3) maintenance functions (118); 4) remote access functions (120); 5) compatibility functions (122); and 6) security functions (124). The payment functions (114) include recognizing and crediting customer payments received in the form of cash (114a), credit (114b), and balance codes (114c) manually entered or encoded into credit vouchers. The back office functions (116) can be varied as desired depending on the filling station environment and operator preferences. In the illustrated embodiment, the back office functions implemented by the control system (112) include generating (116a) records for each transaction, storing (116b) transaction information for backup record keeping in the case of transmission failures between the filling station site and the remote host computer, reporting (116c) the transaction information (e.g., in the form of printouts) to the system administrator and providing (116d) an accounting interface between the control system and accounting programs associated with the remote host computer or a data system of a store associated with the filling station. The back office functions (116) also include providing (116e) an interface with tank monitoring equipment to track fuel inventory and generating (116f) fuel orders when fuel inventory reaches a selected level. The fuel orders can be transmitted to the host computer or directly to a supplier via a pager or computer interface.

The maintenance functions (118) include generating (118a) error alarms and tracking (118b) hardware events such as malfunctions, revisions or tampering. The error alarms may take various forms such as transmitting an error message to the host computer or paging a servicing agent. The nature of the error alarm generated may depend, for example, on the urgency of the identified error, the time of day, etc. Error messages may include some or all of the following: 1) pump off line; 2) pump paper is out; 3) pump paper is low; 4) credit card interface is down; 5) pump not reset for next sale; 6) receipt paper jammed; 7) bill acceptor jammed; and 8) emergency shutoff activated.

The remote access function (120) allows the filling station site to be monitored and controlled via the remote host computer. These functions include retrieving (120a) transaction data, changing (120b) operating parameters such fuel prices, expiration periods for codes, prioritization of error alarms, installing (120c) system changes and upgrades by downloading codes from the remote host computer to the site controller, and polling (120d) the filling station sites and displaying the site status on a monitor associated with the remote host computer. Preferably, the site status for a given site is formatted to show all status information for a particular site on one screen. The status information can include, for example, the status of all alarm parameters.

The compatibility functions (122) ensure that the control system can communicate with various related data systems. For example, the fuel pump systems preferably employ industry standard cash acceptors and dispensers. Accordingly, the compatibility function (122) assures compliance with such standards (122a). In addition, in the case of a filling station site associated with a store, the control system may be designed for compatibility with the store's data system (122b) to exchange data for inventory and bookkeeping purposes. Similarly, the control system (112) may be programed to accept the same credit cards under the same conditions as the store.

The security functions (124) are intended to discourage improper access to the network. The security functions (124) preferably define a number of security levels or grades (124a) for controlling access to the network. For example, a fuel vendor may be allowed access for the limited purpose of monitoring fuel inventory and reporting refueling levels. A vending machine servicing agent may be allowed access to the network for the limited purpose of monitoring coin and bill supplies and restocking as necessary. The control system also preferably allows passwords to be set and changed (124b) as desired from the remote host computer. Finally, the security system may verify (124c) administrative access cards which allow access to network administers for retrieving records, upgrading systems and performing other administrative functions.

The automated filling station network of the present invention provides on the spot change in the form of currency or credit voucher for use and subsequent fueling transactions as desired by the user. The network enhances customer convenience, reduces labor costs and hazards to personnel and reduces operating costs and fuel prices. The network thereby realizes many of the potential advantages of automated filling stations that have not been achieved in conventional systems.

While various implementations of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in operating at least one filling station, comprising the steps of:
   providing at least one pump system for dispensing fuel, said pump system including a payment processor for receiving payments from customers and controlling operation of said pump system in response to said payments;
   receiving a payment amount from a customer at said pump system;
   first operating said payment processor to monitor a fueling process by said customer so as to identify a completion of said fueling process and determine an amount due associated with said fueling process;
   second operating said payment processor to compare said payment amount to said amount due to determine any balance due to said customer in connection with said fueling process and associate a code with said balance;
   providing a change dispenser system for dispensing change to customers in currency, said change dispenser including a code processor for receiving codes and controlling operation of said change dispenser in response to said codes;

receiving said code at said change dispenser system;

employing said code processor to determine said balance due to said customer based on said received code; and dispensing said balance to said customer in currency based on said balance as determined by said code processor.

2. A method as set forth in claim 1, wherein said step of providing at least one pump system comprises providing a fuel pump and providing a computer operatively associated with the fuel pump.

3. A method as set forth in claim 1, wherein said step of receiving a payment comprises receiving currency via at least one of a bill acceptor and a coin acceptor.

4. A method as set forth in claim 1, wherein said step of receiving a payment comprises receiving a balance code via one of a keyboard and a credit voucher.

5. A method as set forth in claim 1, wherein said step of receiving a payment comprises obtaining an authorization for a credit card.

6. A method as set forth in claim 1, wherein said step of providing a change dispenser system comprises providing a change dispenser and providing a computer operatively associated with the change dispenser.

7. A method as set forth in claim 1, wherein said step of receiving said code comprises receiving a balance code via one of a keyboard and a coded credit voucher.

8. A method as set forth in claim 1, wherein said step of employing said code processor comprises operating said code processor to retrieve a balance amount associated with said code from a database.

9. A method as set forth in claim 1, wherein said step of dispensing said balance comprises dispensing bills and coins.

10. A method as set forth in claim 1, wherein said step of providing at least one pump system comprises providing a plurality of pump systems.

11. A method as set forth in claim 10, further comprising the step of operatively interconnecting each of said plurality of pump systems to said change dispenser system such that said change dispenser system can provide change with respect to fueling processes conducted at any of said plurality of pump systems.

12. A method as set forth in claim 1, further comprising the step of providing a site controller at said at least one filling station and, a remote host computer, interconnected to said site controller via a communications network, wherein said site controller and said remote host computer exchange information regarding operation of said filling station via said communications network.

13. A method as set forth in claim 12, further comprising the step of interconnecting said remote host computer to a second site controller of a second filling station.

14. A method for use in operating a filling station, comprising the steps of:

providing a plurality of pump systems for pumping fuel, each of said pump systems capable of providing balance codes to customers reflecting balances due to said customers in connection with fueling transactions;

providing a change dispenser system capable of receiving said balance codes and issuing change in currency;

interconnecting each of said plurality of pump systems to said change dispenser system such that said change dispenser system can provide change in currency with respect to particular fueling transactions at any of plurality of pump systems.

15. A method as set fort in claim 14, wherein said step of interconnecting comprises providing a site controller for receiving code information from each of said pump systems and controlling operation of said change dispenser to provide change based on said received code information.

16. A method as set forth in claim 14, further comprising the steps of operating a controller to monitor a fueling process so as to determine a balance due to a customer and providing a balance code wherein balance code cam be used to dispense currency from said change dispenser system.

17. An apparatus for use in operating a filling station having at least one fuel pump comprising:

first means, associated with said pump, for receiving payment from a customer;

second means, associated with said pump, for comparing a transaction amount associated with a fueling process by said customer to said payment amount in order to determine a balance due to said customer;

third means, associated with said second means, for receiving said balance and dispensing change in currency to said customer and means for associating a code with said determined balance.

18. An apparatus as set forth in claim 17, further comprising means for providing said code to said customer.

19. An apparatus as set forth in claim 18, wherein said means for providing comprises a credit voucher dispenser.

20. An apparatus as set forth in claim 18, wherein said third means comprises means for receiving said code from said customer.

* * * * *